(12) United States Patent
Yuan et al.

(10) Patent No.: US 7,636,891 B2
(45) Date of Patent: Dec. 22, 2009

(54) METHOD FOR PAGINATING A DOCUMENT STRUCTURE OF A DOCUMENT FOR VIEWING ON A MOBILE COMMUNICATION DEVICE

(75) Inventors: Jianwei (Oliver) Yuan, Cumming, GA (US); Olav A. Sylthe, Atlanta, GA (US)

(73) Assignee: Research In Motion Limited, Waterloo, Ontario (CA)

( * ) Notice: Subject to any disclaimer, the term of this patent is extended or adjusted under 35 U.S.C. 154(b) by 769 days.

(21) Appl. No.: 10/931,290

(22) Filed: Aug. 31, 2004

(65) Prior Publication Data

US 2006/0056334 A1    Mar. 16, 2006

(51) Int. Cl.
*G06F 3/00* (2006.01)

(52) U.S. Cl. .............. 715/744; 370/310; 370/338; 709/203; 709/227; 715/227; 715/234; 715/238; 715/241; 715/776

(58) Field of Classification Search ............ 370/310, 370/328; 709/203, 227; 715/227, 234, 238, 715/241, 500, 525, 744, 776
See application file for complete search history.

(56) References Cited

U.S. PATENT DOCUMENTS

| | | | |
|---|---|---|---|
| 6,160,554 A | 12/2000 | Krause | |
| 6,256,666 B1 | 7/2001 | Singhal | |
| 6,300,947 B1 | 10/2001 | Kanevsky | |
| 6,360,252 B1 | 3/2002 | Rudy et al. | |
| 6,438,585 B2 | 8/2002 | Mousseau et al. | |
| 6,768,999 B2 | 7/2004 | Prager et al. | |
| 6,895,550 B2 | 5/2005 | Kanchirayappa et al. | |
| 2002/0129277 A1 | 9/2002 | Caccavale | |
| 2002/0161796 A1 | 10/2002 | Sylthe et al. | |
| 2003/0023628 A1* | 1/2003 | Girardot et al. | 707/513 |
| 2003/0236821 A1* | 12/2003 | Jiau | 709/203 |
| 2004/0133854 A1 | 7/2004 | Black | |

(Continued)

FOREIGN PATENT DOCUMENTS

WO    02/44948    6/2002

(Continued)

OTHER PUBLICATIONS

"On-Demand Retrieval of Attached File in Mail System", IBM Technical Disclosure Bulletin, IBM Corp., New York, USA, vol. 41, No. 1, Jan. 1998, p. 623, XP000772234, ISSN: 0018-8689.

(Continued)

*Primary Examiner*—Dwayne Bost
*Assistant Examiner*—Matthew W Genack
(74) *Attorney, Agent, or Firm*—Philip E. Levy; Brij K. Agarwal; Eckert Seamans Cherin & Mellott, LLC

(57) ABSTRACT

A process for transmitting a document from a server to a mobile device on a per page basis, comprising building a graph structure within the server representing a map of the document, transmitting a page size limit from the mobile device to the server indicative of the size of a single page of the document to be displayed by the mobile device, traversing and paginating the graph structure into successive pages based on the page size limit, caching the pages within the server, and transmitting the successive pages from the server to said the mobile device for display by said the mobile device.

10 Claims, 6 Drawing Sheets

U.S. PATENT DOCUMENTS

| | | |
|---|---|---|
| 2004/0139397 A1 | 7/2004 | Sylthe et al. |
| 2005/0039034 A1* | 2/2005 | Doyle et al. .............. 713/193 |
| 2005/0066037 A1* | 3/2005 | Song et al. ................ 709/227 |
| 2005/0200610 A1 | 9/2005 | Skantze et al. |
| 2006/0056334 A1 | 3/2006 | Yuan et al. |

FOREIGN PATENT DOCUMENTS

| | | |
|---|---|---|
| WO | 2004/042507 | 5/2004 |

OTHER PUBLICATIONS

Borenstein, N et al., "RFC 1521: MIME (Multipurpose Internet Mail Extensions) Part One: Mechanisms for Specifying and Describing the Format of Internet Message Bodies", Network Working Group Request for Comments, XX, XX, Sep. 1993, pp. 1-44, XP002260381.

iGilliot Research. White Paper: "Wireless Access to Email Attachments and Documents", 2001. 16 pages.

M.G. Schultz, E. Eskin, E. Zadok, M. Bhattachryya, S.J. Stolfo: "MEF: Malicious Email Filter—A UNIX Mail Filter that Detects Malicious Windows Executables", Jun. 30, 2001, Proceedings of the Freenix Track: 2001 Usenix Annual Technical Conference, Boston, Mass., USA XP002300865.

R. Rivest, "The MD5 Message-Digest Algorithm," Apr. 1992, IETF RFC 1321.

Rodriguez et al."New Capabilities in IBM WebSphere Transcoding Publisher Version 3.5 Extending Web Applications to the Pervasive World", IBM Redbooks, May 2001 (available at http://www.redbooks.ibm.com/redbooks/pdfs/sg246233.pdf).

* cited by examiner

METHOD FOR PAGINATING A DOCUMENT STRUCTURE OF A DOCUMENT FOR VIEWING ON A MOBILE COMMUNICATION DEVICE

FIELD OF THE INVENTION

The following is directed in general to displaying content on mobile communication devices, and more particularly to a method for viewing a selected portion of a document on a mobile communication device without having to retrieve the full document onto the device.

BACKGROUND OF THE INVENTION

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, bandwidth and processing constraints of such devices present challenges to the downloading and viewing of documents, such as word processing documents, tables and images.

Electronic documents are produced using various computer programs, such as word processors, spreadsheet programs, financial software, and presentation software. In addition to text, such documents contain structural and property information such as paragraph indentation, text color and table size, etc.

The downloading of an entire document, including structural and property information, to a mobile communication device consumes a large amount of bandwidth, especially when the document is very large. In addition, viewing even a portion of such a downloaded document on the device consumes substantial device CPU/memory/battery resources.

For example, if a user wishes to view only a paragraph in a section in the middle of a 400-page document, the section that contains some of the default properties for the paragraph, or even the entire document, must be transmitted to the mobile communication device. Yet, the user only views a small portion of the document on the mobile communication device.

SUMMARY OF THE INVENTION

According to an aspect of the invention, a method is provided for viewing a selected portion of a document on a mobile communication device without having to retrieve the full document onto the device. In one embodiment, a server pagination function is used for viewing selected portions of a document on a mobile communication device by retrieving the document page-by-page based on user requests at the mobile device. This allows the user to view only a small part of the document to determine if additional document content is required, and the user's document viewing experience is similar to that when using a desktop PC. More importantly, bandwidth usage and device power consumption are minimized by eliminating unnecessary document content transmission to the device.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which.

DETAILED DESCRIPTION OF THE PREFERRED EMBODIMENT

Figure 1:
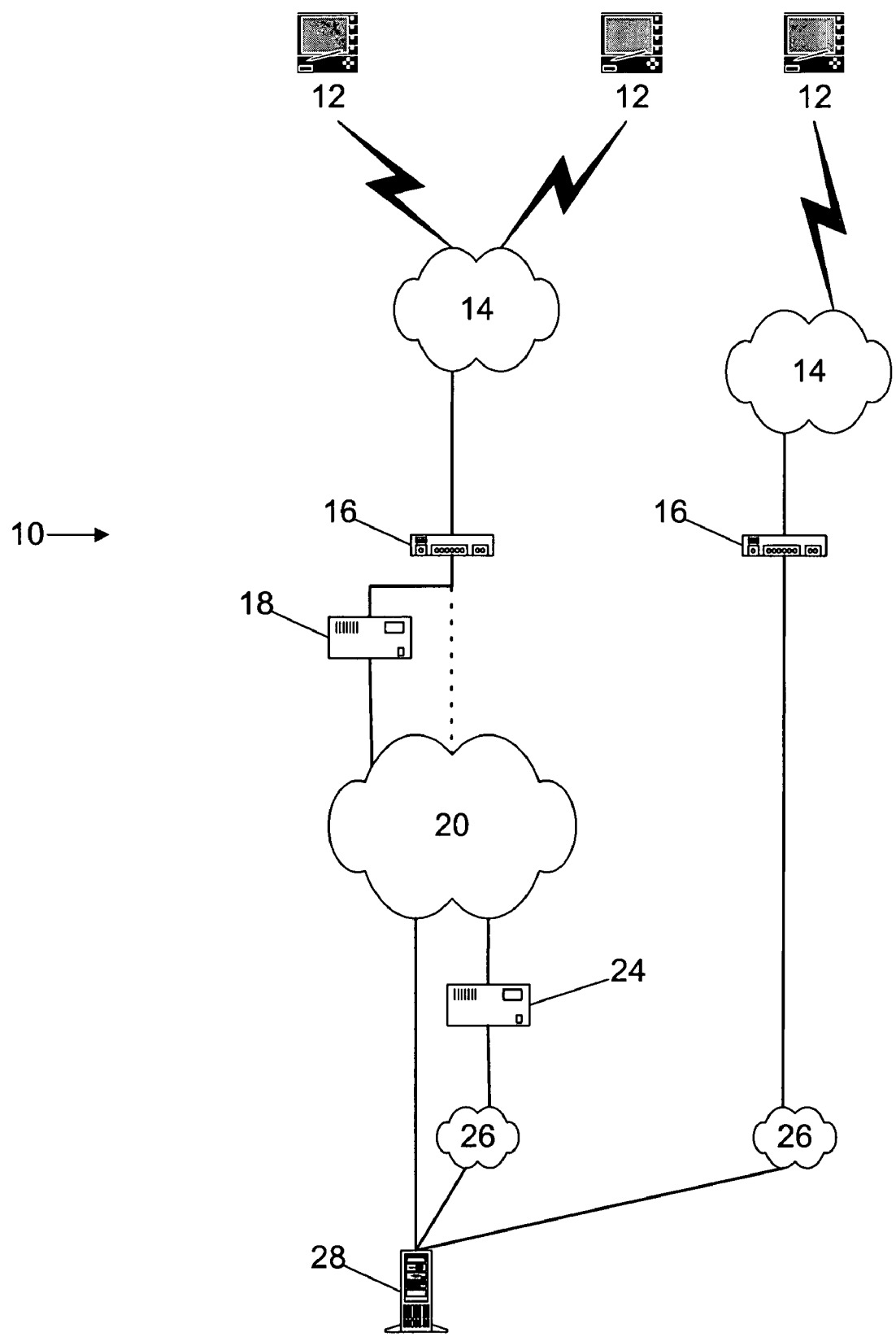
FIG. 1 is a block diagram of a network environment in which the preferred embodiment may be practiced.

With reference to FIG. 1, network environment 10 is shown in which the preferred embodiment may be practiced. Network environment 10 includes mobile devices 12 communicating via a wireless network 14 to a server 28 for downloading document attachments to the mobile devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SGI, MP4, MOV, GIF, SVG, etc. As would be understood by one of ordinary skill in the art, wireless networks 14 include GSM/GPRS, CDPD, TDMA, iDEN Mobitex, DataTAC networks, or future networks such as EDGE or UMTS, and broadband networks like Bluetooth and variants of 802.11.

A connection to a fixed service requires special considerations, and may require special permission as authorized through a Network Access Point (NAP) 16. For generic services, such as web access, a proxy-gateway or Network Address Translator (NAT) 18 may be provided so that a network operator can control and bill for the access. NATs 18 enable management of a limited supply of public Internet addresses for large populations of wireless mobile devices. Solutions offered by a proxy-gateway or NAT 18 often involve a complex infrastructure, and thus may be managed by value-added service providers (VASPs), which provide, for instance, WAP gateways, WAP proxy gateway solutions, multi-media messaging servers (MMS) and Internet Multi-Media Services (IMS).

Private Intranet services 26 may require an associated Private Intranet Proxy Gateway 24 for accessing content on server 28. Such private services include WML access to corporate mail systems, HTML access to CRM databases, or any other services that deliver information as formatted data with links and URLs embedded. As shown, it is possible that a private service 26 may be connected directly to the wireless network 14, as opposed to being connected via Internet 20.

Referred to throughout this document, for the purpose of describing the preferred embodiment, is the structure of a Document Object Model (DOM) for a document attachment to be viewed on a mobile device 12.

The attachment server 28 uses a file-parsing distiller in the preferred embodiment, for a specific document type, to build an in-memory Document Object Model (DOM) structure representing an attachment of that document type. The document DOM structure is stored in a memory cache of server 28, and can be iterated bi-directionally.

Figure 2:
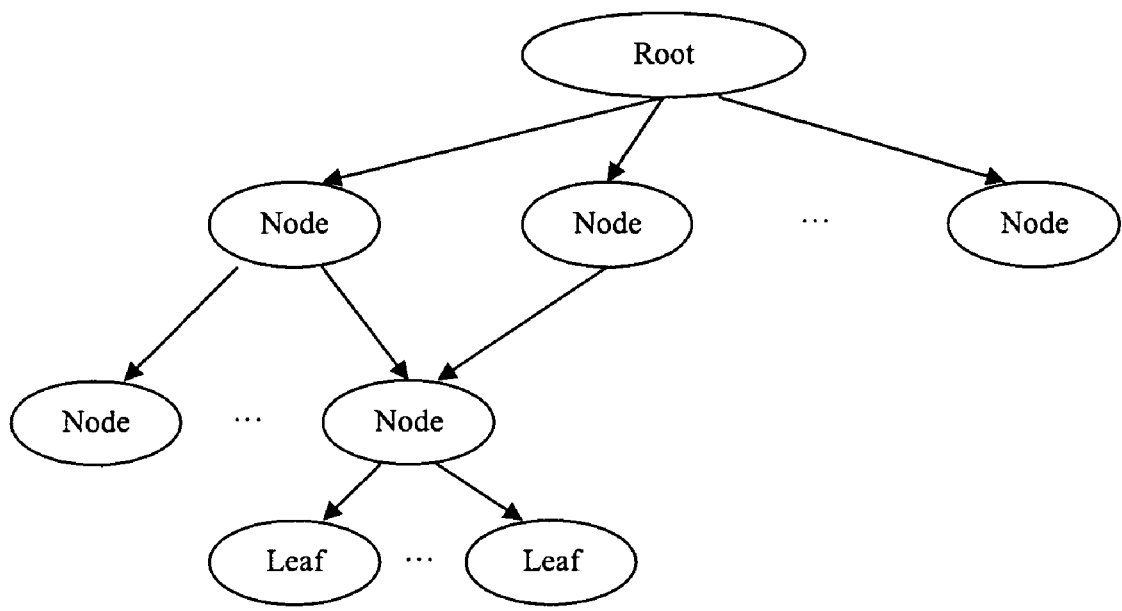
FIG. 2 is a tree diagram showing the basic structure of a Document Object Model (DOM) used in the preferred embodiment.

As shown in FIG. 2, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 3:
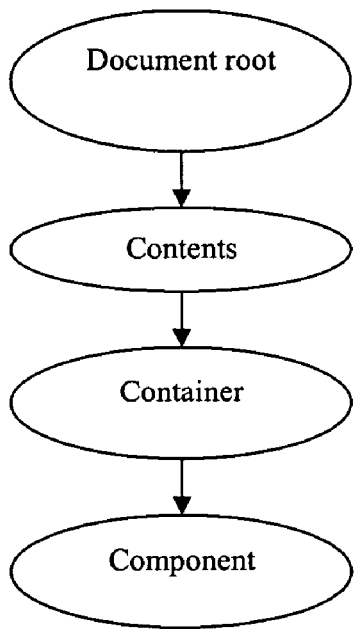
FIG. 3 shows the top-level of the DOM structure in FIG. 2.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain as shown in FIG. 3:

Three types of components are defined by the attachment server 28: text components, table components and image components, which represent text, tables and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 4:
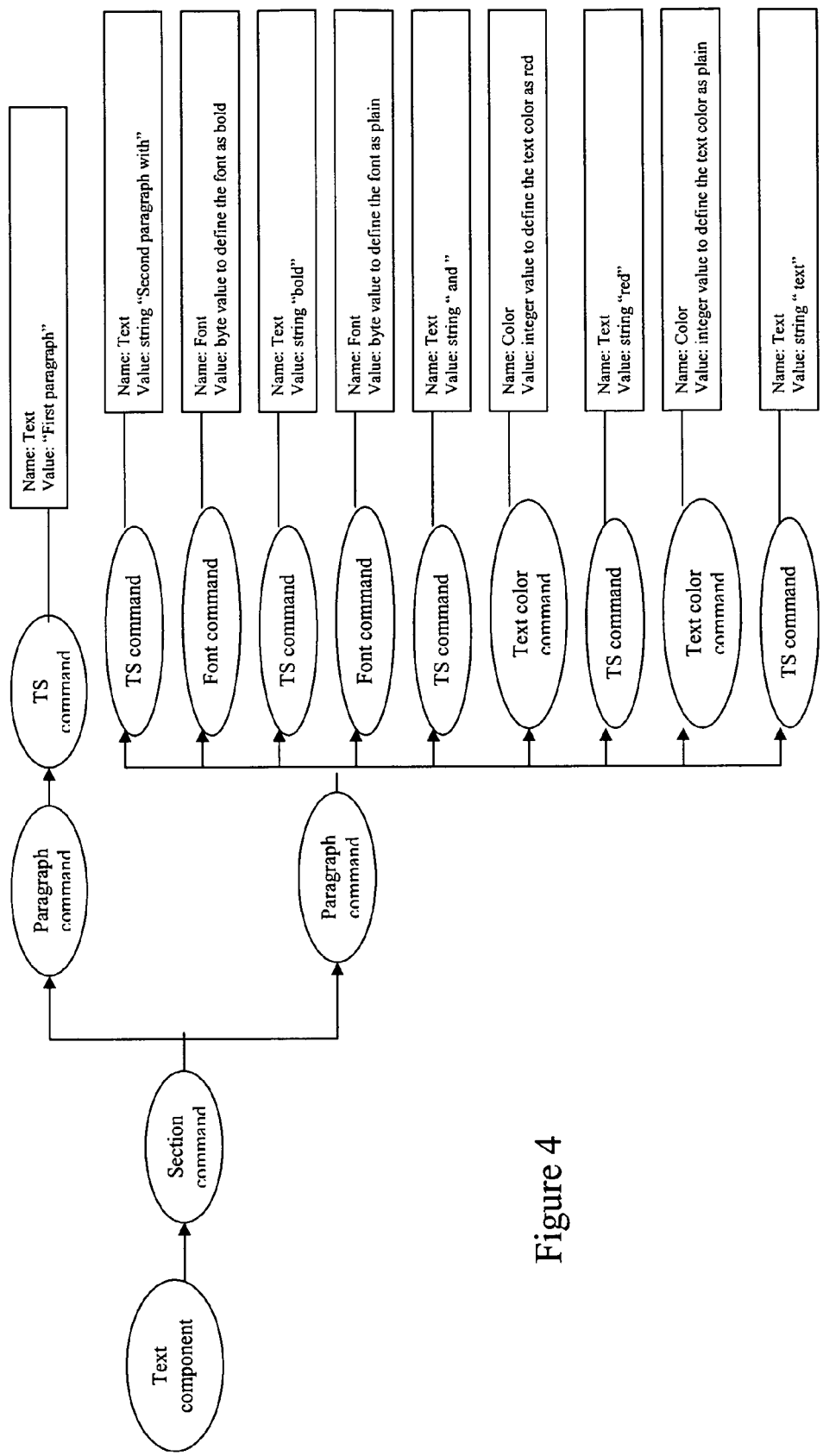
FIG. 4 shows an exemplary DOM structure for a word processing document.

Using the following sample text document, the corresponding document DOM structure is shown in FIG. 4:
  First paragraph.
  Second paragraph with bold and red text.
As FIG. 4 demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc) changes, a corresponding text property command is created and the change value is added to that command as an attribute.

The subsequent text segment command records the text with the same text property as an attribute. As document structure gets richer and more complex, more commands of corresponding types are created and the document properties are added as attributes to those commands.

The table component has the same three types of commands as the text component, but different command names. The document DOM structure for the sample table document below is shown in FIG. 5:

| Cell One | Cell Two |
| Cell Three | Cell Four |

Figure 5:
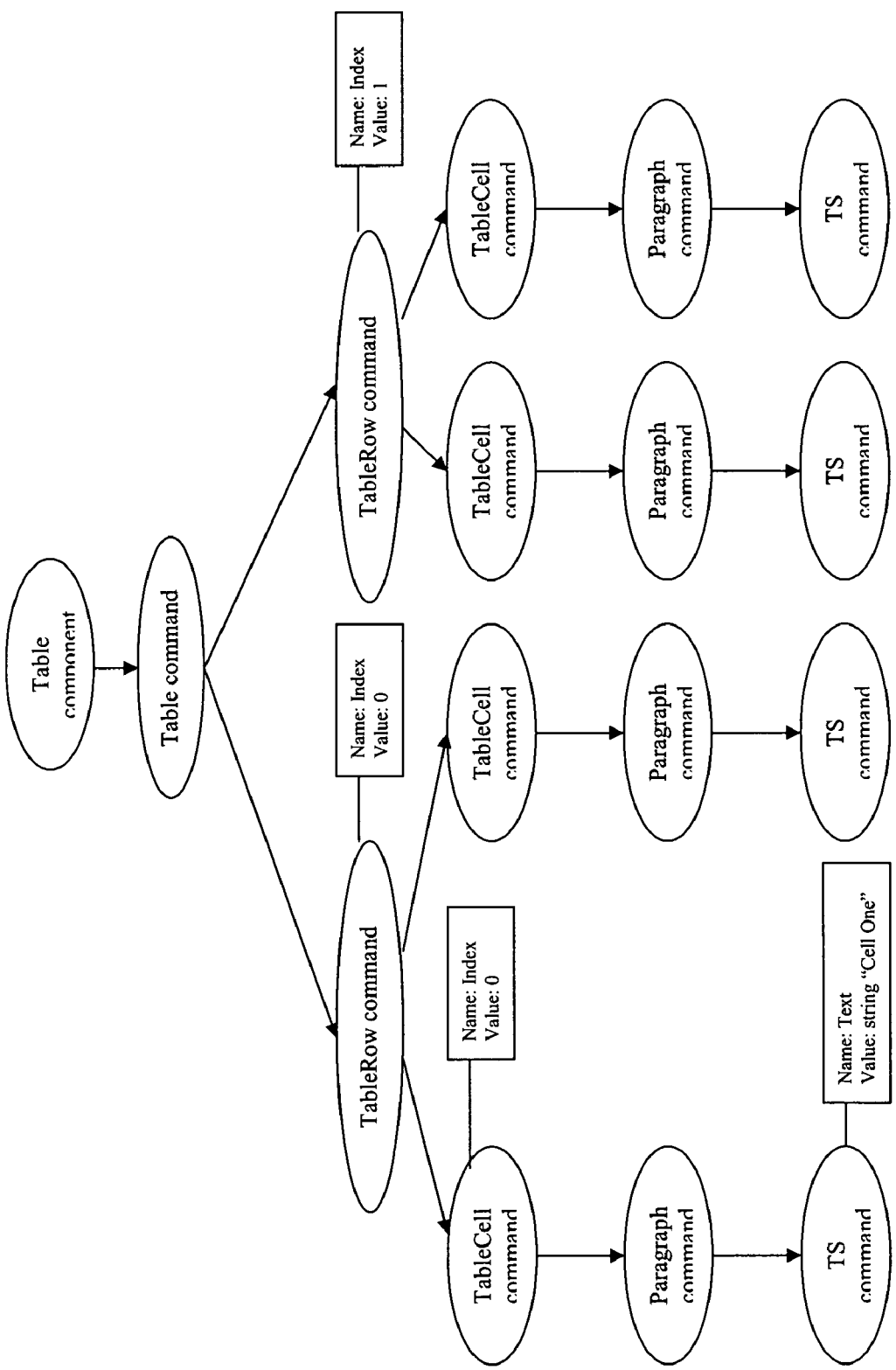
FIG. 5 shows an exemplary DOM structure for a table document.

As shown in the FIG. 5, the table component has physical entity type commands of table, tablerow and tablecell, where the tablecell command can contain all available commands for the text component. In the example above, the first child TableRow command of the table command has an attribute "Index" defined by value of 0. This indicates that the indicated table row is the first one defined in the table. The attribute of the leftmost table cell command in FIG. 5 has the same meaning.

A document sometimes contains subdocuments, for example images, tables, text boxes etc. The DOM structure set forth herein uses a reference command to point to the graph of such subdocuments. Thus, for the following sample document, the attachment server 28 generates the DOM structure shown in FIG. 6:

This document has subdocument of images like this one 

Second paragraph contains the same image 

Figure 6:
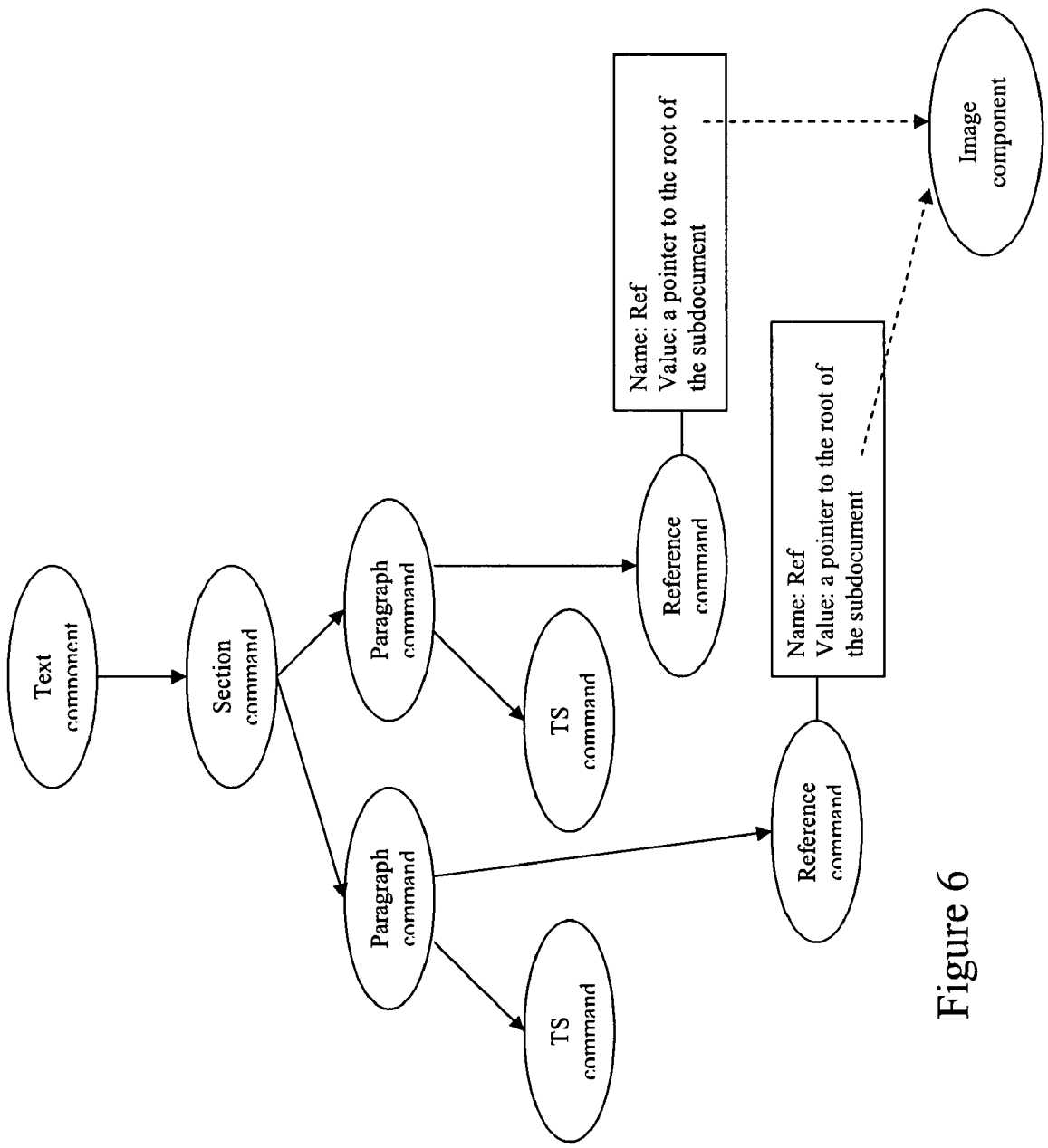
FIG. 6 shows an exemplary DOM structure for a word processing document containing an image subdocument.

The structure shown in FIG. 6 is identical to that discussed above in connection with FIGS. 4 and 5, except for the attributes of the two reference commands. The attachment server 28 constructs the image in "Sample Three" as a separate image component, which contains all of the image data in its own DOM hierarchy. In the DOM structure for the main document, the values of the "Ref" attributes of those two reference commands point to the image component, as indicated by the dashed lines, such that the DOM structure connects together all parts of the document.

Having described the document DOM structure used to implement an embodiment of the invention, a detailed discussion will now be provided of a pagination function or method according to the preferred embodiment.

Figure 7:
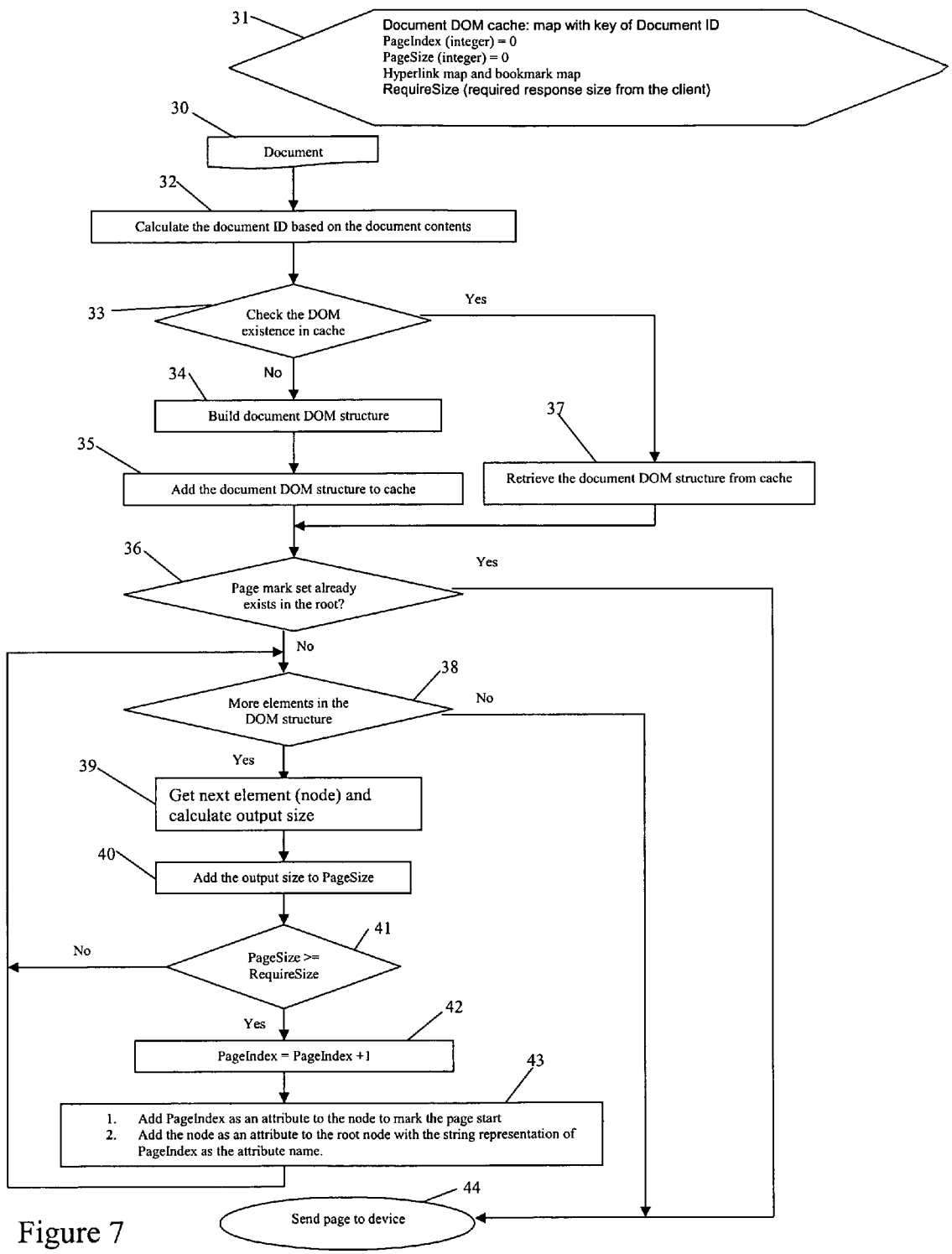
FIG. 7 is a flowchart showing document DOM structure construction and pagination according to the preferred embodiment.

The pagination function is a client and server side operation. FIG. 7 shows the processing steps, from which it will be noted that the server 28 uses a map in memory for document DOM cache storage and the key to the map is the document ID. Initially, when the user of a mobile communication device 12 sends a request to the server 28 to view a document, the device 12 sends two attributes and number of bytes it requires (RequireSize) as a response from the server (e.g. 3K bytes). The two attributes are whether the device is a color or monochrome device, and the screen size (width×height×color depth) of the device in pixels. Other information about the device 12 can also be transmitted to the server 28 (e.g. memory size). After the server 28 receives a document-viewing request, it starts the pagination process (step 30), and initializes the variables PageIndex and PageSize.

The following terms and variables are initialized, as shown at step 31 in FIG. 7:

The PageIndex variable is defined in the server 28 and used by the server to record the current page index being paginated by the server. The page index is initially set to 0 indicating "Page 1".

PageSize is a variable defined in the server 28 and used by the server to record the current size for the page being paginated and is reset to 0 when paginating a new page.

Hyperlink map is a variable defined in the server 28, which is a container consisting of the element type of hyperlink node in the document DOM structure. The key (ID) for each element in the container is the hyperlink target string.

Bookmark map is a variable defined in the server 28 which is a container consisting of the element type of current page index (PageIndex value) for the bookmark in the document DOM structure. The key (ID) for each element in the container is the bookmark string.

The server process constructs a document ID (step 32) based on the document contents and uses the ID to check the document DOM cache (step 33) to determine whether the document DOM structure for that document has been constructed. If the document DOM structure does not exist in the cache, the server builds the DOM structure (step 34) for the document and adds it to the cache (step 35). Otherwise, if the document DOM structure exists in the cache, it is retrieved (step 37).

To construct the document ID, the original document file is opened in read and binary mode. The server 28 creates a MD5 Context structure, hashes the MD5 context structure with raw binary data byte-by-byte from the file, and finalizes the MD5 context structure and retrieves the 16 byte key for the file. The MD5 context structure has the following structure in syntax of C++ language

```
typedef struct
{
    unsigned long adwState[4];  /* state (ABCD) */
    unsigned long adwCount[2];  /* number of bits, modulo 2^64
        (lsb first) */
    unsigned char abyBuffer[64]; /* input buffer */
} tMD5_CTX
```

Caching the document DOM structure requires considerable memory, and therefore increases the overall hardware deployment cost. On the other hand, building the DOM structure for a document is even more time and CPU intensive in contrast to the document key construction operation, especially for big documents. Since that processing time is more critical than hardware deployment cost for wireless operation, caching the document DOM is the approach adopted for the preferred embodiment, rather than building the DOM structure for the document each time the server receives a viewing request and then discarding the structure after sending the response back to the client device 12.

Once the document DOM structure has been built and stored in the cache, the server 28 determines whether a page mark has already been set in the root (step 36). If not, the server traverses through the DOM structure (steps 38, 39, 40 and 41) and calculates the output size (PageSize) for each node in the DOM structure based on the number of bytes (RequireSize) provided by the device 12. The server increments the PageIndex (step 42), adds it as an attribute to each node in order to mark the start of each page, and adds each node as an attribute to the root node with the string representation of PageIndex as the attribute name (step 43). Following this pagination function, the attachment server 28 transmits the document page-by-page to the requesting mobile device 12 based on client generated requests (step 44).

The page mark attribute name is associated with the device information and required response size (RequireSize) provided by the device 12, to enable the server to paginate through the document DOM structure and generate the response based on the device capability. For example if the device is a monochrome type, the color information contained inside the DOM structure will be ignored during the server pagination and response generation operations and therefore optimize the wireless bandwidth utilization.

Since the key to the memory map is the document ID, the algorithm used to calculate the document ID (step 32) must guarantee the uniqueness of the key. According to the best mode, as set forth above, the algorithm used inside the server 28 is the MD5 messaging encryption algorithm invented by Professor Ronald L. Rivest of MIT Laboratory for Computer Science and RSA Data Security, Inc. There are several other hashing options that can be used. However MD5 is the most efficient and reliable one based on the broad range of different document content required to be processed by the server 28.

A person skilled in the art, having read this description of the preferred embodiment, may conceive of variations and alternative embodiments. For example, generating multiple sets of page marks for successive pages requires considerable time and CPU usage since the server 28 has to re-traverse the DOM structure. Accordingly, one alternative is for the server 28 to create only one set of page marks in a document DOM structure and generate the response based on the device information. However, this approach is likely to create more page marks than necessary and will introduce extra transactions between the wireless device 12 and the server 28 if the user wants to view a large portion of a document. Based on the understanding that minimizing the wireless bandwidth usage is more critical than the processing time on the server, creating multiple sets of the page marks and caching them is the approach adopted in the preferred embodiment.

All such variations and alternative embodiments are believed to be within the ambit of the claims appended hereto.

What is claimed is:

1. A process for transmitting a document from a server to a mobile device on a per page basis, comprising:
    building a graph structure within said server representing a map of said document; transmitting page size limit from said mobile device to said server indicative of the size of a single page of said document to be displayed by said mobile device;
    traversing and paginating said graph structure into successive pages within said server based on said page size limit;
    caching said pages within said server; and
    transmitting said successive pages from said server to said mobile device for display by said mobile device,
    wherein traversing and paginating said graph structure further comprises:
        initializing a page size value;
        retrieving and calculating output size of successive nodes of the graph structure;
        adding the output size of said successive nodes to said page size value; and
        in the event said page size value exceeds said page size limit for a given node then marking said graph structure to identify said node as starting a new page for transmission to said mobile device, and wherein marking said graph structure further comprises:

maintaining a page index value that is incremented with each new page;

adding said page index value as an attribute to each said given node for marking each said new page; and adding each said given node as an attribute to a root node of said graph structure with a string representation of said page index value as attribute name.

2. The process of claim 1, further comprising calculating a document ID based on contents of said document before building said graph structure, checking a memory cache of said server using said document ID for said graph having been previously built, and in the event said graph structure exists in the memory cache then omitting the building of said graph structure.

3. The process of claim 2, wherein calculating said document ID further comprises performing a hashing function on the contents of said document and in response generating said document ID as a unique key to said map.

4. The process of claim 3, wherein said hashing function comprises the MD5 messaging encryption algorithm.

5. The process of any one of claims 1 and 2 to 4, wherein said graph structure is a Document Object Model (DOM).

6. A server process comprising:

building a graph structure representing a map of a document;

traversing and paginating said graph structure into successive pages based on a page size limit; and caching said pages within said server, wherein traversing and paginating said graph structure further comprises:

initializing a page size value;

retrieving and calculating output size of successive nodes of the graph structure;

adding the output size of said successive nodes to said page size value; and in the event said page size value exceeds said page size limit for a given node then marking said graph structure to identify said node as starting a new page, and wherein marking said graph structure further comprises maintaining a page index value that is incremented with each new page; adding said page index value as an attribute to each said given node for marking each said new page; and adding each said given node as an attribute to a root node of said graph structure with a string representation of said page index value as attribute name.

7. The server process of claim 6, further comprising calculating a document ID based on contents of said document before building said graph structure, checking a memory cache of said server using said document ID for said graph having been previously built, and in the event said graph structure exists in the memory cache then omitting the building of said graph structure.

8. The server process of claim 7, wherein calculating said document ID further comprises performing a hashing function on the contents of said document and in response generating said document ID as a unique key to said map.

9. The server process of claim 8, wherein said hashing function comprises the MD5 messaging encryption algorithm.

10. The server process of any one of claims 6 and 7 to 9, wherein said graph structure is a Document Object Model (DOM).

* * * * *

UNITED STATES PATENT AND TRADEMARK OFFICE
CERTIFICATE OF CORRECTION

PATENT NO. : 7,636,891 B2  Page 1 of 1
APPLICATION NO. : 10/931290
DATED : December 22, 2009
INVENTOR(S) : Yuan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,891 B2 | Page 1 of 1 |
| APPLICATION NO. | : 10/931290 | |
| DATED | : December 22, 2009 | |
| INVENTOR(S) | : Jianwei Oliver Yuan et al. | |

It is certified that error appears in the above-identified patent and that said Letters Patent is hereby corrected as shown below:

Column 3, lines 56 and 57,
"First paragraph.
Second paragraph with bold and red text."
should read --
> First paragraph.
> Second paragraph with bold and red text.

--

Column 4, line 21, "by value" should read --by a value--.

Column 5, line 33, "a MD5" should read --an MD5--.

Signed and Sealed this
Fifteenth Day of March, 2011

David J. Kappos
*Director of the United States Patent and Trademark Office*